United States Patent [19]

Johnson

[11] Patent Number: 4,649,086
[45] Date of Patent: Mar. 10, 1987

[54] LOW FRICTION AND GALLING RESISTANT COATINGS AND PROCESSES FOR COATING

[75] Inventor: Roger N. Johnson, Richland, Wash.

[73] Assignee: The United States of America as represented by the United States Department of Energy, Washington, D.C.

[21] Appl. No.: 703,856

[22] Filed: Feb. 21, 1985

[51] Int. Cl.$^4$ ............................................. B32B 15/04
[52] U.S. Cl. ...................................... 428/627; 427/37;
427/405; 427/419.7; 428/336; 428/614;
428/678; 428/679; 428/680
[58] Field of Search ....................... 427/37, 405, 419.7;
428/336, 627, 614, 678, 679, 680

[56] References Cited

U.S. PATENT DOCUMENTS

| | | | |
|---|---|---|---|
| 4,049,431 | 9/1977 | Hagel et al. | 75/126 C |
| 4,049,432 | 9/1977 | Hagel et al. | 75/128 F |
| 4,129,462 | 12/1978 | Korenko | 148/31 |
| 4,225,363 | 9/1980 | Korenko | 148/12.7 N |
| 4,225,364 | 9/1980 | Gibson et al. | 148/31 |
| 4,231,795 | 11/1980 | Gibson et al. | 75/171 |
| 4,236,943 | 12/1980 | Korenko et al. | 148/32.5 |
| 4,359,349 | 11/1982 | Merrick et al. | 148/12.3 |
| 4,359,350 | 11/1982 | Laidler et al. | 148/12.3 |
| 4,377,553 | 3/1982 | Korenko | 420/584 |
| 4,405,851 | 9/1983 | Sheldon | 219/76.13 |
| 4,407,673 | 10/1983 | Korenko | 75/128 A |
| 4,421,572 | 12/1983 | Bates et al. | 148/12 E |
| 4,435,231 | 3/1984 | Korenko | 148/12 EA |

OTHER PUBLICATIONS

Bennett et al., "Materials Requirements for LMFBRs" Met. Trans. A, vol. 9A, Feb. 1978, pp. 143-149.
Johnson et al., "Development of Low Friction Materials for LMFBR Components," Proc. Int'l Conf. Liquid Metal Tech. in Energy Prod., USERDA Conf. Publ. 760503-P1 U.S. ERDA, Wash. DC (1976).
Johnson et al., "Wear Resistant Coatings for Reactor Components in Liquid Sodium Environments," Journal of Vac. Sci. & Tech., vol. 11, No. 4, Jul./Aug. 1974, pp. 759,764.
Johnson, "Coatings for Fast Breeder Reactor Components" orally presented Apr. 9, 1984 San Diego, CA and published in Thin Solid Films, vol. 118, No. 1 (Aug. 1984), pp. 29-45.

Primary Examiner—Bernard D. Pianalto
Attorney, Agent, or Firm—R. D. Fuerle

[57] ABSTRACT

The present invention describes coating processes and the resultant coated articles for use in high temperature sodium environments, such as those found in liquid metal fast breeder reactors and their associated systems. The substrate to which the coating is applied may be either an iron base or nickel base alloy. The coating itself is applied to the substrate by electro-spark deposition techniques which result in metallurgical bonding between the coating and the substrate. One coating according to the present invention involves electro-spark depositing material from a cemented chromium carbide electrode and an aluminum electrode. Another coating according to the present invention involves electro-spark depositing material from a cemented chromium carbide electrode and a nickel-base hardfacing alloy electrode.

27 Claims, 3 Drawing Figures

LOW FRICTION AND GALLING RESISTANT COATINGS AND PROCESSES FOR COATING

GOVERNMENT CONTRACT

The invention described herein was made during the course of, or in the performance of work, under U.S. Government Contract No. DE-AC06-76FF02170 under the auspices of the Dept. of Energy.

The present invention pertains to the fields of coating processes and resultant coatings on structural alloys which provide low friction and galling resistant surfaces. It especially pertains to ESD (electro-spark deposited) coatings for use in rubbing contact with similarly coated structural alloys or uncoated structural alloys, especially in liquid metal environments.

Over the years a number of commercial as well as developmental alloys have been evaluated for use in the elevated temperature liquid metal environments encountered in a liquid metal fast breeder reactor (LMFBR) and its associated systems which also handle liquid metal (e.g. pump components and steam generator components). Within the LMFBR itself, a high energy neutron (0.1 MeV to 1.0 MeV) environment exists in which fuel rod cladding and duct components see service in contact with flowing, low oxygen (<1 ppm) sodium. The fuel cladding has surface temperatures of about 400° C. (~750° F.) to about 650° C. (~1200° F.). Ducts, surrounding each bundle of fuel pins, see service at about 380° C. (~715° F.) to about 550° C. (~1020° F.). These components may be exposed at the aforementioned elevated temperatures to neutron fluxes on the order of $10^{15}$ n/cm$^2$.s (E>0.1 MeV), and should be capable of performing adequately to fluences on the order of 2 to $3 \times 10^{23}$ n/cm$^2$ (E>0.1 MeV). Additional information about LMFBR materials, components, conditions, and concerns are outlined in Bennett and Horton, "Materials Requirements for Liquid Metal Fast Breeder Reactors," *Metallurgical Transactions A*, Vol. 9A, February 1978, pp. 143-149.

Included among the commercial austenitic stainless steels evaluated is AISI 316 whose chemistry is described in U.S. Pat. No. 4,421,572. The developmental austenitic stainless steels evaluated include the D9 type alloys and are exemplified by the alloys described in U.S. Pat. No. 4,407,673 (D9—B1) and U.S. patent application Ser. Nos. 414,167 and 484,322, filed on Sept. 2, 1982 and Apr. 12, 1983, respectively. One feature that is common to all the foregoing austenitic stainless steel alloys is that for use as LMFBR fuel cladding or ducts it is desired that they be in a cold worked microstructural condition in order to delay the onset of neutron irradiation induced swelling.

Among the commercial ferritic stainless steels considered have been HT-9 (a trademark of Sandvik Corporation) for its martensitic alloy which nominally contains 11.5 wt.% Cr—1 wt.% Mo—0.2 wt.% C—0.4 wt.% Si—0.5 wt.% Ni—0.5 wt.% Mn—0.3 wt.% V—0.5 wt.% W—balance essentially iron).

Other ferritic stainless steels considered have been 9 Cr—1 Mo type alloys (ASME-SA812, Grade F9, UNS. No. K90941, 2.25 Cr—1Mo type alloys (ASME-SA182, Grade F22, UNS. No. K21590) and those alloys described in U.S. Pat. Nos. 4,049,431; 4,049,432; 4,075,010; 4,435,231; and U.S. patent application Ser. No. 370,439, filed on Apr. 21, 1982. These alloys have been considered for use as ducts, fuel cladding, and steam generator tubing and tubing support structures.

Other alloys considered include austenitic precipitation hardening nickel base and iron base alloys described in U.S. Pat. Nos. 4,129,462; 4,231,795; 4,377,555; 4,359,349; 4,359,350; 4,236,943; 4,362,696; and U.S. patent application Ser. Nos. 370,438, and 180,770, filed on Apr. 21, 1982 and Aug. 22, 1980, respectively. Similar commercial alloys that have been considered for LMFBR related applications include Niomonic PE16 and Inconel 706 and 718. (These are nickel base alloys marketed by the International Nickel Co.)

One concern that has been common to the usage of all of the above structural materials in the liquid sodium environments described, has been their ability to resist damage caused by rubbing contact with other components.

Development of low-friction and wear-resistant materials for liquid sodium environments has long been recognized as one key to the successful design and operation of LMFBR components. Low friction surfaces provide reliable operation of mechanical components, ease of assembly of complex and close tolerance parts, reduced operating forces and power requirements, lower stresses in components, and reduced surface damage and wear. Some nuclear applications impose a maximum allowable friction coefficient that makes a low-friction material or coating virtually mandatory. A variety of industrial bearings, lubricants, and materials are available to provide low friction or low wear, but when the special environments and temperatures of LMFBR's are considered, the list of candidate materials for low-friction applications becomes severely restricted. Besides being a poor lubricant, sodium is a highly reactive coolant, which precludes the use of nearly all known liquid or solid lubricants. High-temperature sodium is also exceptionally effective in stripping oxide layers from most material surfaces. The resulting highly-cleaned surfaces can exhibit much higher friction and self-welding tendencies than the same surfaces would show in most other environments. The U.S. Dept. of Energy National Tribology Program has been developing, evaluating, and qualifying low friction and wear resistant materials for advanced energy systems, with most efforts so far directed toward liquid metal environments. Materials include structural materials and alloys, weld-deposited hardfacings, coatings and platings, cast bearing materials, and lubricants. LMFBR applications for such wear-resistant materials include fuel assembly interfaces, control rod drive mechanisms, fuel handling machines, heat exchangers, valve seats and bearings, coolant pump bearings, test loop components, and many others.

Through the foregoing program a number of coatings have emerged. For example it has been found that nickel—aluminide coated (i.e. aluminized) Inconel 718 has superior wear, friction, and corrosion properties compared to uncoated Inconel 718 in liquid sodium. This coating is formed by diffusion of aluminum into the nickel alloy surface forming a surface layer of NiAl. The coating process used requires that the part be held at about 1000° C. or higher, for a significant period of time. These heat treatment requirements limit the uses to which this coating can be applied. For example, this high temperature coating process can anneal out the desired cold worked microstructure of a 316 or D9 type alloy component.

Another coating developed is chromium carbide and 15 volume percent nichrome (80 wt.% Ni—20 wt.% Cr) applied by the detonation gun process, directly to 20% cold worked 316 duct wear pads. The detonation gun process is a method of producing high mechanical bond strength coatings on most metallic substrates. In the detonation gun process, a mixture of oxygen and acetylene, along with powdered coating material, is introduced into the chamber of the gun. The gas is detonated by a spark plug and the resulting explosion heats the powder to near melting and propels the hot particles out the barrel of the gun at supersonic velocities. The impingement of these high kinetic energy particles at high temperatures on the substrate produces a dense, well-bonded coating. The process is repeated at about 250–500 shots/minute to build up the coating to the desired thickness level.

The limitations of this coating are those common to other mechanically bonded coatings, i.e., proper substrate preparation is critical to achieving adequate bonding, rigid process and quality controls are exceptionally important, and high contact stresses (above the yield strength of the substrate) must be avoided.

Additional information with respect to the application of the aforementioned and other coatings are provided in R. N. Johnson et al., "Development of Low Friction Materials for LMFBR Components," *Proceedings of the International Conference on Liquid Metal Technology in Energy Production*, USERDA Conf. Publ. 760503-Pl, U.S. Energy Research and Development Administration, Washington, DC (1976) and R. N. Johnson et al., "Wear Resistant Coatings for Reactor Components in Liquid Sodium Environments", *Journal of Vacuum Science & Technology*, Vol. 11, No. 4, July/August 1974 pp. 759–764.

I have found that one of the most promising advances in coating technology for reactor component applications has been ESD (Electro-Spark Deposited) coatings. The ESD coatings are produced by discharging stored energy from high voltage capacitors through an electrode of the material to be deposited. In the resulting spark, a small amount of material is melted and removed from the electrode and welded to the substrate material. An ESD coating apparatus and its operation are described in Sheldon U.S. Pat. No. 4,405,851.

One of the principal advantages of the ESD process is that thin (usually 25 to 50 $\mu$m) layers of nearly any electrically conductive material can be fused to a metal surface with such a low heat input that the bulk substrate material remains at or near ambient temperature. This essentially eliminates thermal distortions or changes in metallurgical structure (except for a small diffusion zone) of the substrate. It also produces a coating that, because of its metallurgical bonding, is significantly more resistant to damage and wear than coatings applied by most other low-heat-input processes, such as detonation-gun, plasma spray, electro-chemical deposition, etc. (see my paper, "Coatings for Fast Breeder Reactor Components" published in *Thin Solid Films* Vol. 118 no. 1 (August 1984) pp. 29–45).

I have further surprisingly found that in accordance with the present invention the following ESD coatings, having superior wear and friction properties, can be provided by the following ESD processes.

A substrate of an iron base alloy or a nickel base alloy is ESD coated to an average thickness between about 7.5 and 100 microns (hereinafter all coating thicknesses referred to are average values). This ESD coating, in accordance with the present invention, is formed by ESD depositing material from a cemented carbide electrode of chromium carbide in a nickel base matrix and ESD depositing material from an electrode selected from the group of aluminum and its alloys containing at least 95 wt.% aluminum, or nickel—molybdenum—chromium alloys containing greater than 20 wt.% molybdenum.

In the ESD coating utilizing aluminum, it is most preferred that the layer formed by the cemented carbide electrode be about 15 to 50 microns thick and that the aluminum be lightly applied onto it, thereby maintaining about the same coating thickness while forming an aluminum rich alloy zone of about 3 to 10 microns thick adjacent to the coatings surface. After the ESD coating is complete, it is also preferred that the roughness of the aluminized surface be reduced (by light buffing, for example) and the coating surface then oxidized.

In the ESD coating utilizing a Ni—Mo—Cr alloy, it is most preferred that the layer formed by the cemented carbide electrode be about 15 to 50 microns thick and that a Ni—Mo—Cr alloy, such as Tribaloy 700 (a trademark of the Cabot Corporation for its laves hardened hardfacing alloy containing nominally: Ni—32 wt.% Mo—15 wt.% Cr—3 wt.% Si) be applied as an overlayer of about 2 to 6 microns, and most preferably about 5 microns thick. After coating, the roughness of the surface is preferably reduced, for example, by light buffing.

The substrate metallurgically bonded to the foregoing ESD coatings may be any iron base or nickel base alloy. Preferably, the iron base alloys are ferritic or austenitic stainless steels or superalloys, such as those previously referred to herein. The nickel base alloys may include any of the known commercial nickel base alloys such as Inconel 600, 706, or 718, in addition to the alloys previously referred to herein.

These and other aspects of the present invention will become more apparent upon review of the drawings briefly described below, in conjunction with the detailed description of the invention which follows.

DETAILED DESCRIPTION OF THE INVENTION

Figure 1:
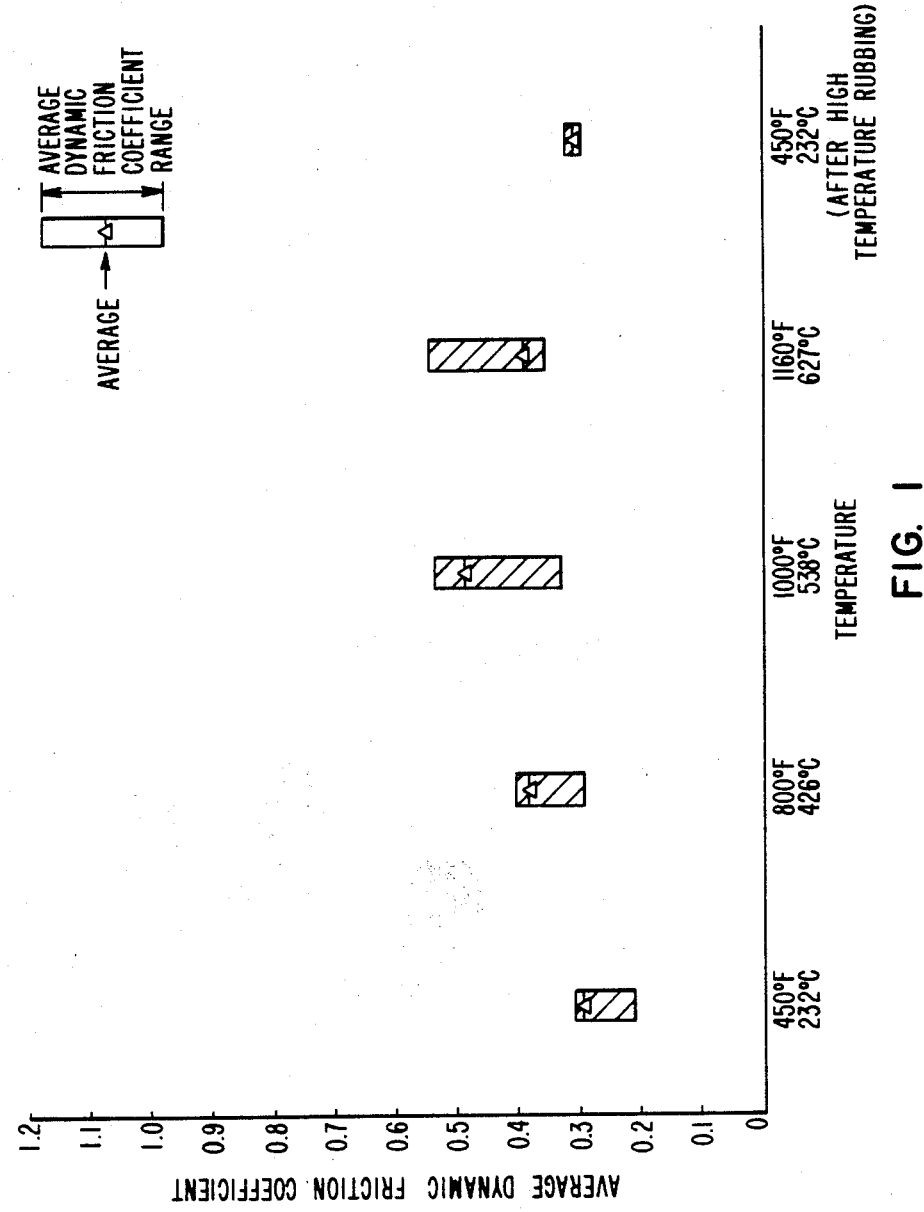
FIG. 1 shows the average dynamic friction coefficient of an embodiment of the present invention at various temperatures in low oxygen sodium.

The ESD process is a micro-welding process and therefore does not simply deposit a pure coating of whatever electrode material is used. Since the surface of the substrate is also melted (at least momentarily) the deposit consists of a fused mixture of the substrate and the molten material transferred from the electrode.

Subsequent layers, of course, can be used to further modify the surface composition, and, if the same electrode is used, the surface composition of the deposit will eventually approach the composition of the electrode. Usually, process parameters may be adjusted to produce coatings with varying levels of substrate dilution in the coating. For example, other factors being equal, the coating composition tends to approach the electrode composition (i.e. minimal substrate dilution effect) with increasing thermal conductivity of the substrate, increasing speed of travel of the electrode over the substrate, decreasing electrode mass, increasing substrate melting point and heat capacity, decreasing electrode melting point and heat capacity, decreasing substrate temperature, and increasing number of coating layers. For example, in my work in which ESD deposited material from a C815 cemented carbide electrode (C815 is a fully dense, sintered, chromium carbide (about 85 volume percent) in a matrix of about 15 volume percent nickel, marketed by Carmet Inc. of Spartanburg, S.C.) on to either ferritic or austenitic stainless steel, that at least about a 7.5 micron, and more preferably about 12.5 microns, thick coating was required to avoid excessive dilution of the coating with material from the substrate causing a significant decrease in hardness. However, I have found that if the coating is too thick (i.e. above about 100 microns), excessive spalling and/or cracking of the coating may occur, probably caused by excessive internal stresses in the coating. I have found that my best results can be achieved when the coating thickness is between about 15 to about 50 microns, in that excellent hardness is obtained and cracking and/or spalling can be minimized.

The coatings in my invention are (1) a mixture of chromium, carbon, nickel, aluminum, and whatever portion of the substrate material appears as a diluent in the final coating and (2) a mixture of chromium, carbon, nickel, molybdenum, silicon and whatever portion of the substrate appears as a diluent in the final coating. I believe, however, that the substrate effects in the coatings we have tested are minimal, at least for steel substrates ranging from 2¼Cr—1Mo steel to Type 316 stainless steel, and for coating thicknesses greater than about 25 microns, since coatings on these and similar steels have yielded similar test results. It is expected, therefore, that this coating would provide similar tribological performance when applied to most other structural alloys as long as substrate dilution effects are controlled to avoid significant modification of the coating composition and structure. The other structural alloys specifically under contemplation includes the AISI TYPE 304 stainless, D9 type alloys, the HT-9 alloy, 12 Cr—1Mo alloys, as well as the other ferrous alloys previously mentioned for use in LMFBR systems and the commercial (e.g. Inconel 600, 706, and 718) as well as experimental nickel base alloys I have previously referred to.

While in the examples that I will later describe herein the coating was created by depositing a layer from a C815 electrode and then alloying that coating surface with aluminum or Tribaloy 700 in a second ESD deposit, it is my belief that it may also be possible that a sufficiently similar structure would be created by use of a prealloyed electrode of all the constituents (Cr, C, Ni and Al; or Ni—Mo—Cr—Si—Cr—C) or by a duplex deposit where the aluminum or Tribaloy 700 is applied first, followed by an ESD coating from a C815 electrode in such a way that the aluminum or Ni—Mo—Cr—Si alloy is effectively allowed to dilute the deposit—surface.

The characteristic structure of the deposit, inherent to the ESD process, is believed to be a significant contributor, if not a requisite, to the performance of the coating. The ESD process results in extremely rapid solidification of the deposit, which is characterized by an extremely fine grain structure that approaches (and with some materials actually is) an amorphous layer of metallic glass. Although a compositional gradient may exist between the surface and the substrate, typically the individual layers are very homogenous.

The ESD coated articles are further characterized by a substrate which is essentially unaffected by the ESD coating process which metallurgically bonds the coating to the substrate. Except for a minor zone extending inwardly up to about 25 microns from the original substrate surface in which diffusion and heat affects may be observed, the bulk of the substrate retains its original composition microstructure and other properties. For example, this allows cold worked 316 stainless or cold worked D9 type alloys to be coated without annealing out this cold worked microstructure.

The invention will be further clarified by considering the following examples which are intended to be purely exemplary of the present invention.

One embodiment of my low friction coating was developed for use in sodium by applying two hardfacing materials in such a way that the friction and wear performance of the combination was superior to either material by itself. The coating consists of a 25 to 50 μm layer of chromium carbide—15Ni cermet (C815) applied to a metal surface by ESD, with about a 5 μm overlayer of Ni—32—15Cr—3Si hardfacing alloy (Tribaloy 700) also applied by ESD.

Previous tests on ESD coatings made from cemented chromium carbide alone showed unacceptably high friction coefficients at 200° to 400° C. in sodium but desirably low friction at higher temperatures. That coating also showed excellent wear and galling resistance at all temperatures. ESD coatings of the Tribaloy 700 alone, conversely, showed low friction coefficients at lower sodium temperatures but increasing friction and tendencies for galling at the higher temperatures.

I anticipated that the effect of using the duplex coating of the two materials as described above was to achieve a low initial friction coefficient at low temperatures at an expected sacrifice in high temperature friction performance. The chromium carbide layer was intended to provide a backup wear protection and to limit the galling possible with the Tribaloy 700. The actual result, however, was low friction (see FIG. 1) and complete elimination of galling at all temperatures. FIG. 1 shows the average dynamic friction coefficient measured in low oxygen sodium for coated D9—B1 in rubbing contact with itself. The results shown in FIG. 1 were obtained from pin-on-plate rubbing tests using a load of 1000 psi, a stroke length of ¼ to 1 inch, a total rubbing length of at least 100 inches at each temperature, and a total rubbing length for all temperatures of at least 5000 inches.

The mechanism by which this synergistic improvement occurs is not yet fully understood. While not wishing to be bound by theory, I believe that the relative thicknesses of the layers in the duplex coating are important to the performance, but further investigation is necessary to confirm that hypothesis. It also appears that the structure and composition of the surface layer may be modified by alloying effects with the chromium carbide during the coating process so that a different and possibly unique set of properties result.

Figure 2:
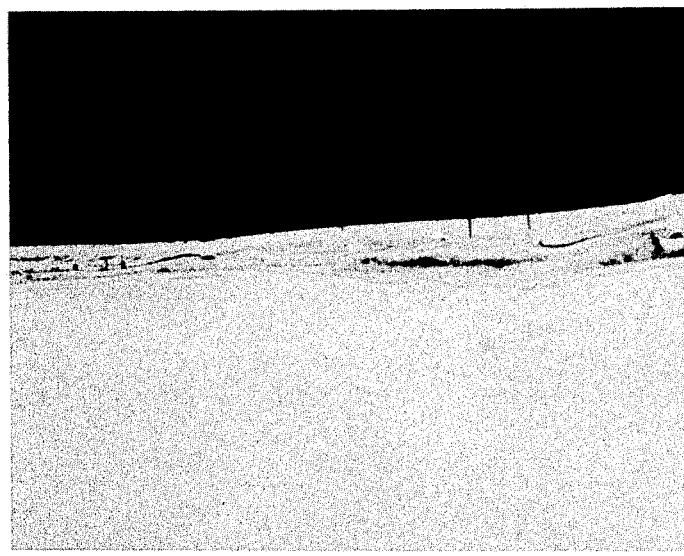
FIG. 2 shows a metallographic cross section through one embodiment of an article coated in accordance with the present invention.

FIG. 2 shows a cross section of an Ni—Mo—Cr modified chromium carbide coating bonded to a 316 stainless steel substrate at 400X. Occasional stress-relief cracks perpendicular to the interface occur in the coating, and have not been found to be detrimental to the tribological performance.

In another embodiment, an ESD coating of chromium carbide—15%Ni (C815) was treated by ESD with aluminum to achieve a significant benefit in tribological performance in sodium. The coating is created by applying 25 to 50 μm of chromium carbide—15%Ni by ESD to the metal surface, and then, alloying the coating surface with a light application of aluminum. The resulting coating remains at approximately the same thickness (25 to 50 μm) but includes an aluminum-rich alloy zone about 3 to 10 μm thick in the surface.

The chromium carbide coating (without the aluminum treatment) shows good wear performance and galling resistance when rubbed against itself or other hard surfaces in sodium. But when the chromium carbide is rubbed against uncoated reactor structural materials such as the austenitic or ferritic steels, severe galling of the steel surface occurs. The addition of aluminum to the chromium carbide—15%Ni by the process described provides a unique coating structure and composition that appears to be highly resistant to galling, self-welding, or adhesive wear in contact with other uncoated metallic surfaces in sodium. The only other materials known to consistently exhibit this behavior are nickel aluminide diffusion coatings that are created by high temperature (~1000° C.) diffusion treatments of nickel-base alloys using the pack cementation process. The process described in this invention is performed at room temperature on nearly any metallic surface without the restrictions inherent to the diffusion coating process. This new ESD coating also exhibits excellent wear an galling resistance in contact with itself or other hard surfaces.

Since the use of this new coating provides good tribological performance in sodium without the necessity of coating both members of a rubbing pair of surfaces, the potential uses are numerous. The coating can be applied to the most convenient surface of a rubbing pair, thus avoiding the treatment of complex or difficult-to-coat components. Steam generator tubes or tube-supports can be coated without the distortion problems associated with high temperature diffusion treatments. Less expensive materials can be used, such as substituting 2¼Cr—1Mo steel for Alloy 718, since the coating can be used on nearly any metal surface, i.e., high-nickel materials are not required. This coating can also be applied to duct wear pads, and control rod and duct components that must rub against stainless steel in low oxygen sodium.

Figure 3:
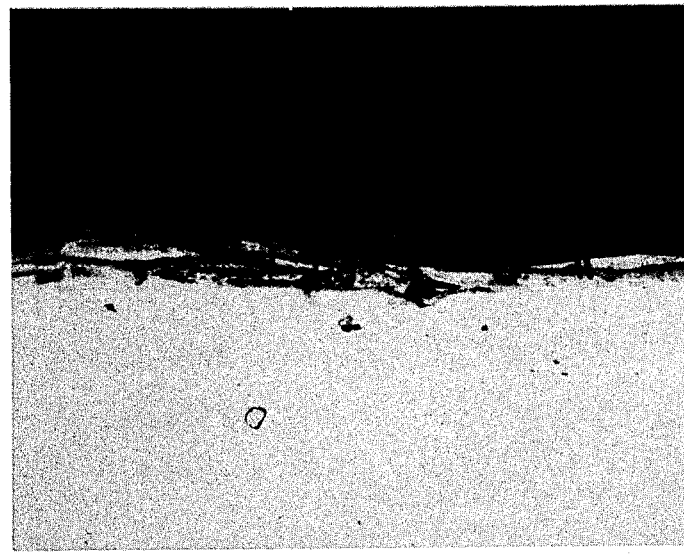
FIG. 3 shows a metallographic cross section through another embodiment of an article coated in accordance with the present invention.

FIG. 3 shows a cross section of an aluminized modified chromium carbide coating on an alloy D9—B1 substrate at 400X. Occasional stress-relief cracks perpendicular to the interface occur in the coating, and have not been found to be detrimental to the tribological performance.

The foregoing coatings were applied using an ESD coating apparatus essentially as described in the specification of Sheldon U.S. Pat. No. 4,405,881 and as shown in FIG. 3 of that patent, with the exception that I rotated my electrodes. I ESD coated materials using the deposition parameters described in Table I as explained below.

TABLE 1

DEPOSITION PARAMETERS FOR APPLYING ALUMINIZED CHROMIUM
CARBIDE COATINGS AND Ni—Mo—Cr MODIFIED CHROMIUM CARBIDE COATINGS BY ESD

| Parameter | Successful Selections | Expected Acceptable Soultions (Untried) |
|---|---|---|
| Substrates | 2¼ Cr—Mo steel, 316 SS, D9 HI-9 | Most structural alloys and steels |
| Electrodes | (1) Chromium carbide - 15% Ni (C815) tube, 0.25" O.D. × 0.125" I.D. (2) Pure Al, rod, 0.125" diam. or 6061 Al, tube, 0.25" O.D., 0.125" I.D. (3) 50 Ni—32 Mo—15 Cr—3Si (Tribaloy-700), rod, 0.125" diam. | (1) Chromium carbide (or chromium carbide with minor additions of other carbides, such as TiC) with 5-25% Ni or Nichrome; (2) Most Al alloys with at least 95% Al (3) Various Ni—Mo—Cr alloys with >20 wt. % Mo |
| Electrode Motion | Rotating, 300 rpm | Rotating, 50 to > 1000 rpm, or oscillating or vibrating |
| Specific Coating Time, min/cm² | C815: 0.8 to 3.5/AL: 0.8 to 1.2/ Tribaloy - 700: 0.6 to 1.2 | 0.1 to > 10 (depending on energy input) |
| Environment | Air, Argon (preferred) | N, He, Ar + 4% H, others |
| Substrate Temperature 20–40° C. | | <0° C. to 100° C. or more |
| Energy Input | 0.1 to 0.2 Joules (0.12 preferred) | .03 to 0.3 Joules |
| Voltage | 40 to 200 V (155 V preferred) | 25 to 250 V |
| Capacitance | 10 to 216 mf (10 mf preferred) | 5 to 350 mf |
| Frequency | 200 to 1400 Hz (850 Hz preferred) | 30 to > 1400 Hz |
| Post-Coating Treatment | Light buffing with SiC/nylon wheel (preferably followed by heat treatment in air at 700° C. for 1 hr. * for aluminized coating only) | No treatment |

* Normallizing treatment for 2¼ Cr—1 Mo steel, also results in light oxidation layer on coating believed beneficial in rapidly establishing NaAlO₂ film in sodium. (Same film likely to form without the oxidation treatment, but would take longer sodium exposure times).

In applying the C815, aluminum and aluminum alloy, material, I passed the gas used down the center of the tubular electrodes. Preferably argon was used since it prevents oxidation, keeps the electrodes cool, helps control the plasma and results in a coating having a much smoother surface finish than air. Reactive gases such as air or nitrogen may be used where it is desired to produce a coating containing oxides or nitrides.

During coating, the electrode was held in contact with the surface being coated under an apparent pressure of about 100 grams and rastered back and forth at a linear speed of 0.7 inches/second and a stepover of between 0.002 to 0.015 inches and more typically 0.005 to 0.010 inches. During coating the electrode was held at a slight tilt (about 12°) to the substrate surface normal. At the same time, the electrode was rotated about its axis at 300 rpm. I have found that rotation of the electrode and increasing the speed of rotation increases the smoothness of the coating. In this manner, the entire surface to be coated is scanned by the electrode, normally 2 to 3 times to build up coating thickness and to fill in any holes in the coating. When applying the aluminum in accordance with the present invention only one pass was made.

Table 1 shows the ESD deposition parameters used to apply the low friction aluminized chromium carbide coatings and the low-friction Ni—Mo—Cr modified chromium carbide coatings. The parameters selected for use on the specimens which I tested in sodium were those that provided the smoothest surfaces, i.e., lower power levels, higher frequencies, rotating electrode, etc.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I hereby incorporate by reference all the foregoing patents, patent applications, articles, and documents which I have previously cited herein.

I claim:

1. A coated article of manufacture comprising:
   a substrate selected from the groups consisting of iron base alloys and nickel base alloys;
   a coating metallurgically bonded to said substrate and having a thickness between 7.5 and 100 microns;
   said coating formed by the process steps comprising:
   electro-spark depositing a first material from a cemented carbide electrode consisting essentially of chromium carbide in a matrix selected from the group consisting of nickel and binary nickel—chromium alloys, said matrix forming about 5 to 25 wt.% of said cemented carbide electrode, whereby a layer of said first material is deposited on said substrate and is alloyed therewith;
   and electro-spark depositing a second material from an electrode selected from the group consisting of aluminum, aluminum alloys containing at least 95 wt.% aluminum, and nickel—molybdenum—chromium alloys containing greater than 20 wt.% molybdenum, whereby a layer of said second material is deposited on said layer of said first material and is alloyed therewith;
   and said coating formed by said process characterized by a combination of excellent wear resistance and a low average dynamic friction coefficient when in rubbing contact with an identically coated component in a liquid, low oxygen, sodium environment at temperatures below about 650° C.

2. The coated article according to claim 1 wherein said cemented carbide electrode is chromium carbide in a matrix of nickel.

3. The coated article according to claim 1 wherein said electrode is said aluminum alloy containing at least 95 wt.% aluminum.

4. The coated article according to claim 1 wherein said electrode is said nickel—molybdenum—chromium alloy containing greater than 20 wt.% molybdenum.

5. The coated article according to claim 4 wherein said electrode is a nickel base alloy nominally containing about 50 wt.% Ni; about 32 wt.% Mo, about 15 wt.% Cr and about 3 wt.% Si.

6. The coated article according to claim 1 wherein said cemented carbide electrode consists essentially of about 85 wt.% chromium carbide and about 15 wt.% nickel.

7. The coated article according to claim 5 wherein said cemented carbide electrode consists essentially of about 85 wt.% chromium carbide and about 15 wt.% nickel.

8. The coated article according to claim 3 wherein said process that formed said coating further comprises the step of oxidizing said coating after electro-spark depositing aluminum from said aluminum electrode.

9. The coated article according to claim 4 wherein the process that formed said coating further comprises the step of oxidizing said coating after electro-spark depositing aluminum alloy from said aluminum alloy electrode.

10. The article according to claim 1 wherein said substrate is an iron base alloy selected from the group consisting of austenitic and ferritic stainless steels.

11. The article according to claim 1 wherein said substrate is an iron base alloy selected from the group consisting of AISI 316 austenitic stainless steels, and D9 austenitic stainless steels.

12. The article according to claim 1 wherein said substrate is in a cold worked condition.

13. The article according to claim 10 wherein said substrate is in a cold worked condition.

14. The article according to claim 11 wherein said substrate is in a cold worked condition.

15. The article according to claim 1 wherein said coating has a thickness of between about 12.5 and 50 microns.

16. The article according to claim 1 wherein said coating has a thickness of between about 15 and 50 microns.

17. The article according to claim 2 wherein said coating thickness is between about 15 and 50 microns.

18. The coated article according to claim 5 wherein said coating thickness produced by said step of electro-sparking depositing material from said cemented carbide electrode is about 15 to 50 microns; and wherein said coating thickness produced by said step of electro-spark depositing material from said nickel base alloy electrode is about 5 microns.

19. A process for coating an alloy substrate selected from the group consisting of iron base and nickel base alloys, said process comprising the steps of:
   electro-spark depositing a first material onto the surface of said substrate from a cemented carbide electrode consisting essentially of chromium carbide in a matrix selected from the group consisting of nickel and binary-nickel—chromium alloys, said matrix forming about 5 to 25 wt.% of said electrode, whereby a layer of said first material is deposited on said substrate and is alloyed therewith;
   repeating said depositing of said material from said cemented carbide electrode as needed to form a coating between about 12.5 and 100 microns thick;
   electro-spark depositing a second material from an electrode selected from the group consisting of aluminum, aluminum alloys containing at least 95 wt.% aluminum, and nickel—molybdenum—chromium alloys containing greater than 20 wt.% molybdenum, whereby a layer of said second material is deposited on said layer on said first material and is alloyed therewith.

20. The process according to claim 19 wherein said electrode is a aluminum and forms an aluminum rich deposit of about 3 to 10 microns thick.

21. The process according to claim 20 wherein said electrode is an aluminum alloy and forms an aluminum rich deposit between about 3 to 10 microns thick.

22. The process according to claim 21 wherein said electrode is a nickel—molybdenum—chromium alloy and forms a deposit between about 2 to 6 microns in thickness.

23. The process according to claim 20 further comprising the step of oxidizing said aluminum deposited from said aluminum electrode.

24. The process according to claim 21 further comprising the step of oxidizing aluminum deposited from said aluminum alloy electrode.

25. The process according to claim 19 further comprising the step of reducing the surface roughness of the coating after the completion of said electro-spark deposition steps.

26. The process according to claim 23 further comprising the step of reducing the surface roughness of the coating after the completion of said electro-spark deposition steps.

27. The process according to claim 24 further comprising the step of reducing the surface roughness of the coating prior to said oxidizing step.

* * * * *